United States Patent [19]

Takada

[11] 4,094,475
[45] June 13, 1978

[54] AUTOMATIC LOCKING SAFETY BELT RETRACTOR

[75] Inventor: Juichiro Takada, Tokyo, Japan

[73] Assignee: Takata Kojyo Co. Ltd., Tokyo, Japan

[21] Appl. No.: 683,574

[22] Filed: May 6, 1976

[30] Foreign Application Priority Data

May 7, 1975  Japan ............................... 50-053847

[51] Int. Cl.² ...................... A62B 35/02; B65H 75/48
[52] U.S. Cl. ............................................. 242/107.4 A
[58] Field of Search .................. 242/107.4 R–107.4 E; 280/744–747; 297/388; 74/575–578; 188/82.7

[56] References Cited

U.S. PATENT DOCUMENTS

| | | | |
|---|---|---|---|
| 3,578,260 | 5/1971 | Kell | 242/107.4 A |
| 3,741,496 | 6/1973 | Beller | 242/107.4 A |
| 3,834,646 | 9/1974 | Heath | 242/107.4 A X |
| 3,952,966 | 4/1976 | Burleigh | 242/107.4 R |
| 3,985,314 | 10/1976 | Booth | 242/107.4 A |

*Primary Examiner*—Harvey C. Hornsby
*Assistant Examiner*—John M. Jillions

*Attorney, Agent, or Firm*—Wolder, Gross & Yavner

[57] ABSTRACT

An automatic locking safety belt retractor includes a belt take-up reel spring biased to rotate in a belt retraction direction and having affixed to its ends a pair of ratchet wheels. Normally retracted pawls are independently advanceable into ratchet wheel engage positions and a sensing mechanism concurrently advances the pawls. There is a phase difference between the relationships of each pawl with a respective ratchet wheel so that with advance of the pawls in the event that one coincides with the tip of a ratchet wheel tooth the other pawl engages the ratchet wheel between successive teeth. In one form the ratchet wheels are similar and have the same number of teeth but are relatively angularly displaced one-half of a tooth pitch and in another form the ratchet wheels have different numbers of teeth. The sensing mechanism includes a pendulum which, upon swinging, raises a cross piece eccentrically coupled at its ends to the pawls to advance the pawls. The cross bar may be coupled to the sensing mechanism at a point intermediate the ends of the cross bar or at a point offset therefrom.

10 Claims, 10 Drawing Figures

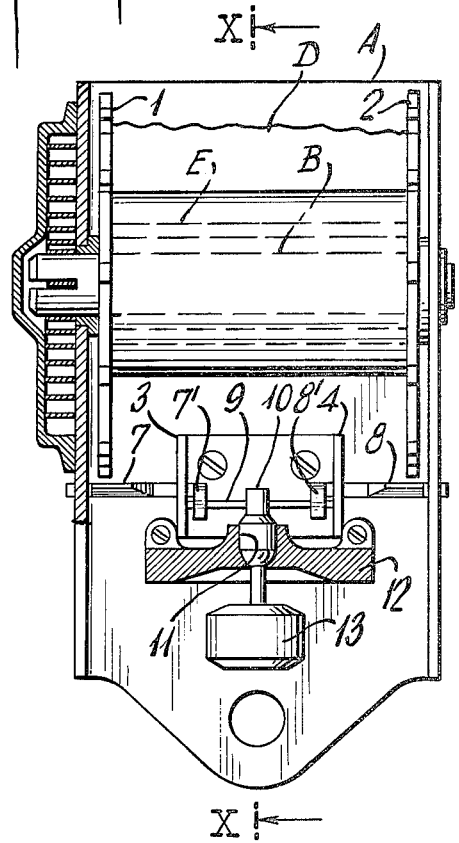
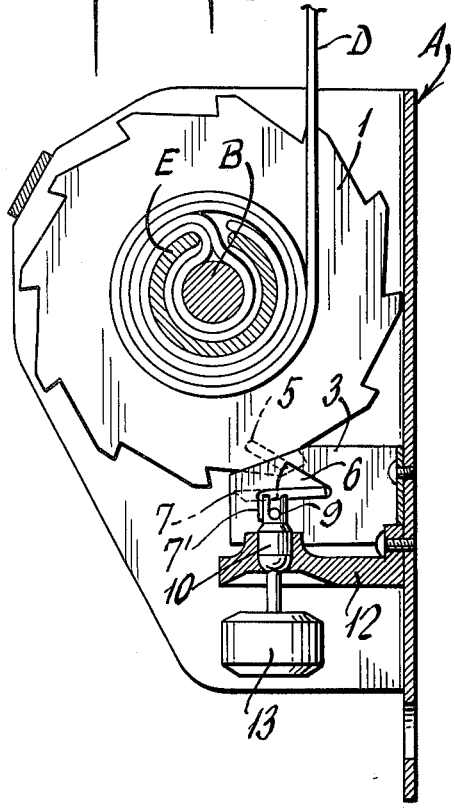
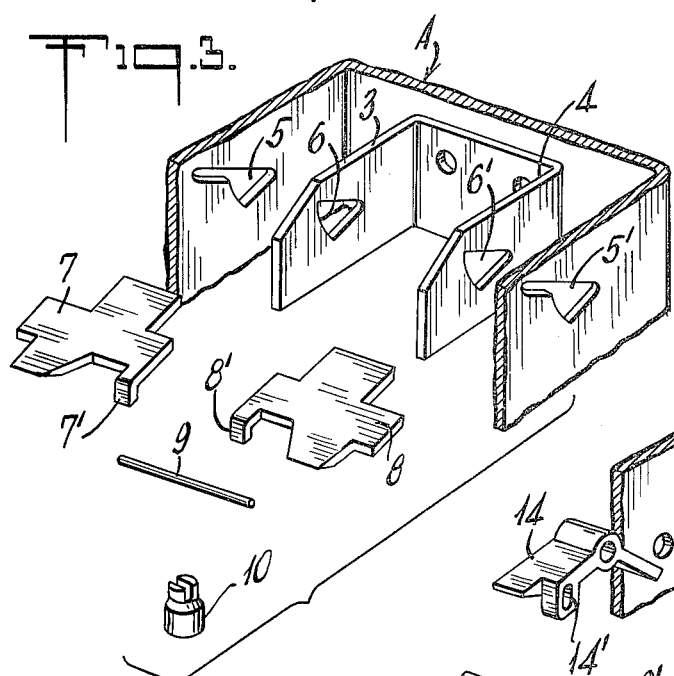
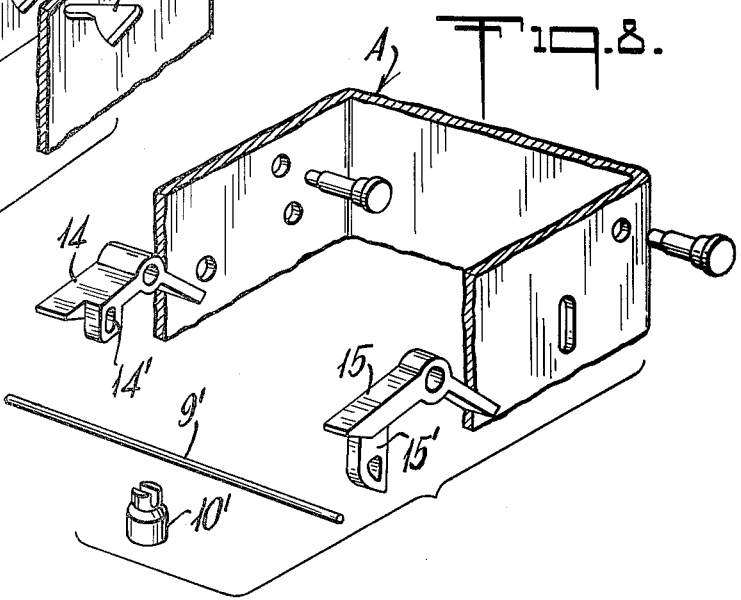

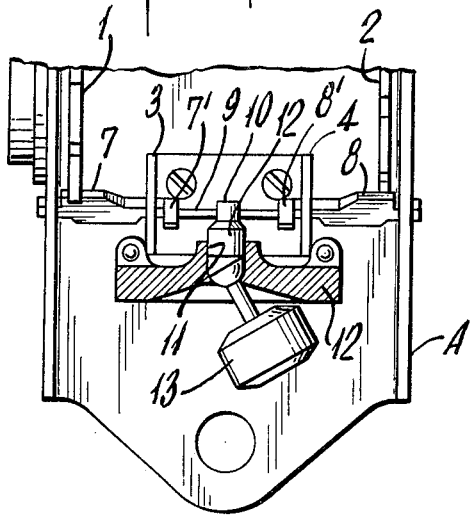
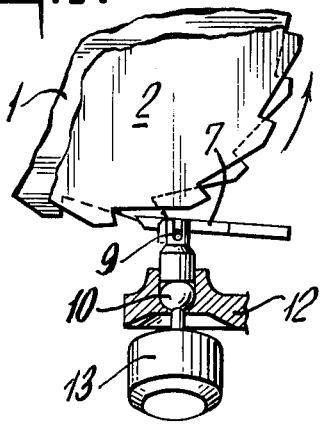
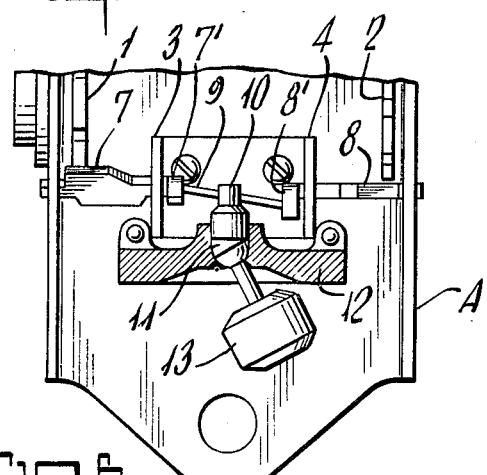
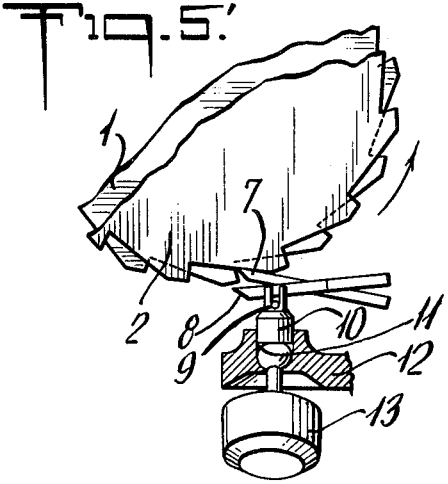
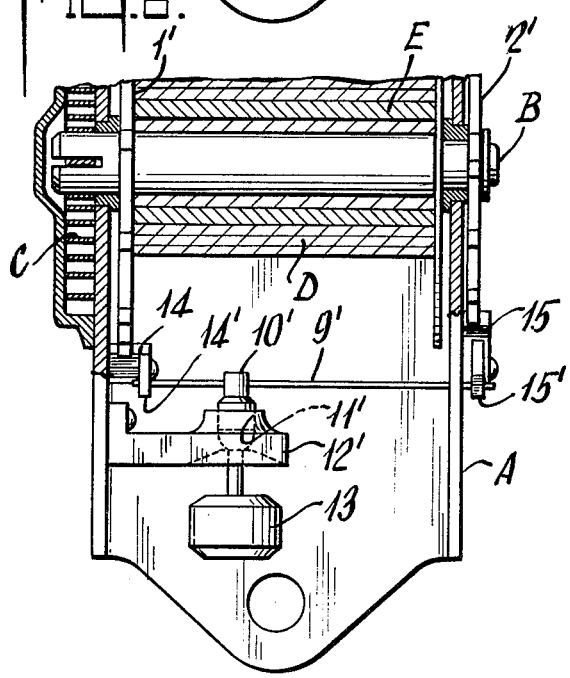
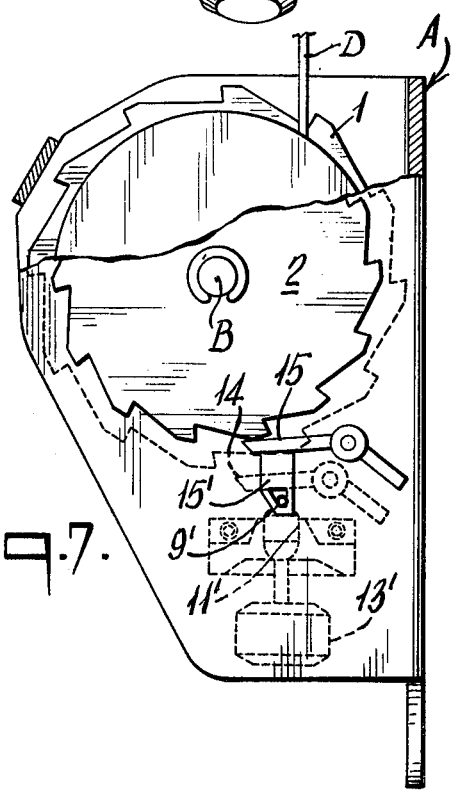

AUTOMATIC LOCKING SAFETY BELT RETRACTOR

BACKGROUND OF THE INVENTION

The present invention relates generally to improvements in vehicle safety belt retractor devices and it relates more particularly to an improved vehicle safety belt retractor which is automatically locked against belt extraction in response to the vehicle acceleration, positive or negative, exceeding a given value.

The conventional acceleration responsive automatic locking belt retractor reel generally employs a highly sensitive acceleration sensing device which responds to transients experienced in many normal driving conditions so that the reel locking and releasing operation occurs with very great frequency thereby incurring many problems as will be hereinafter explained.

In a reel locking mechanism wherein extraction of the safety belt reel is locked by the engagement of a ratchet wheel by a pawl, it often occurs that the tip or tooth top of the pawl and the tip or top of a ratchet wheel tooth are concurrently advanced to an identical position so that the ratchet wheel tooth whose speed is greatly enhanced by the ratchet wheel which is rotated by the extraction force of the safety belt outwardly pushes the pawl tip thereby preventing the locking engagement of the ratchet wheel by the pawl. A considerable interval thereafter occurs during which the normal operation of the pawl in engaging the ratchet wheel is disabled. During this interval a considerable length of safety belt can be extracted from the retractor reel thereby nullifying the effectiveness of the safety belt.

Moreover, with the frequently repeated operation described above the retractor device becomes damaged and highly unreliable by reason of the damage and rupture of the pawl and ratchet wheel teeth tips so that proper locking engagement is no longer assured.

SUMMARY OF THE INVENTION

It is a principal object of the present invention to provide an improved automatic locking safety belt retractor.

Another object of the present invention is to provide an improved automatic locking belt retractor which responds to the vehicle acceleration exceeding a predetermined value in a negative or positive direction, that is acceleration or deceleration.

Still another object of the present invention is to provide an improved acceleration responsive automatic locking mechanism in a belt retractor reel in which excessive wear with consequent malfunctioning is eliminated.

A further object of the present invention is to provide a retractor device of the above nature characterized by its high reliability, ruggedness, simplicity and great versatility and adaptability.

The above and other objects of the present invention will become apparent from a reading of the following description taken in conjunction with the accompanying drawings which illustrate a preferred embodiment thereof.

In a sense the present invention contemplates the provision of a safety belt retractor comprising a reel rotatable in belt extraction and retraction directions and spring biased in a belt retraction rotation direction, a pair of first and second ratchet wheels rotatable with the reel, first and second pawls independently supported for movement between advanced positions engaging respective ratchet wheels and retracted positions releasing said ratchet wheels, and acceleration responsive means for advancing said pawls, said pawls being advanced toward initial engagement with said ratchet wheels at different peripheral relationship relative to the teeth of the respective ratchet wheel. As a consequence, at no time are the tips of both pawls brought into engagement with the tips of corresponding ratchet wheel teeth by reason of the aforesaid different phasal relationship between the two pawls and the respective ratchet wheels.

In accordance with a first preferred embodiment of the present invention the ratchet wheels are similar and have the same number of teeth but are so affixed to the reel that the teeth of one of the ratchet wheels is angularly displaced by one-half the width or pitch of a ratchet wheel tooth from the teeth of the other ratchet wheel. A rockably supported pawl is provided and associated with each ratchet wheel so as to engage therewith and operate independently of the other. The two pawls are connected substantially in alignment with each other by means of a thin shaft which is supported so that the intermediate portion thereof is located in an equilibrium state above the upper portion of an acceleration sensing member under normal conditions, and the support point thereof also is capable of oscillating both vertically and laterally to the right and left relative to the support point.

In this embodiment, even if one of the pawls is outwardly repelled by the corresponding ratchet wheel as explained above, the other pawl engages with the other corresponding ratchet wheel within a half of one tooth pitch away in position and so such an engagement set through instantaneously prevents the seat belt from being extracted any further to thereby ensure the safety of the passengers in the car.

The second preferred embodiment of the present invention also has a substantially same construction as that of the first embodiment. In the second embodiment, the two ratchet wheels have a different number of teeth from each other, and two pawls whose shape may be either the same or different from each other are connected by a thin shaft and are respectively associated with the corresponding ratchet wheels so that each can operate independently of the other and the connecting section thereof is located on substantially a common line. The thin shaft has different distances from its support point and placed above an acceleration sensing member so that it supports both of the pawls and is retained in an equilibrium state together with the pawls under normal conditions. Further, the support point of the thin shaft is allowed to swing both vertically and laterally to the right and left relative thereto in different ranges of oscillation.

Because of this arrangement, one of the two ratchet wheels is engaged by one of the pawls while the other ratchet wheel is auxiliarly engaged by an opposite pawl when the former is outwardly repelled due to the aforementioned coincidence of pawl and ratchet wheel tooth tips. The engagement of the principal ratchet wheel acts to lock the seat belt within such a short period of time as, for example, 8 milli-sec., thus to result in decreasing the frequency of the accidental repulsion. Even if the pawl is pushed out repulsively, the auxiliary ratchet wheel engages with the pawl within a pitch range of one tooth, that is to say, within 3 milli-sec. for example, and prevents the extraction of the seat belt to ensure protection of the passenger in the car.

The apparatus according to the present invention as described above with respect to the two embodiments may also be provided, at a position such as the outside of the mounting bracket or frame, etc., together with a locking mechanism which is responsive to the extraction force of the seat belt. Such an integrally assembled composite retractor apparatus having a locking mechanism and an acceleration/deceleration-responsive retractor mechanism can be supplied with excellent safety as above explained.

BRIEF DESCRIPTION OF THE DRAWINGS

FIG. 1 is a front elevational view, partially in section, of a retractor device embodying the present invention;

FIG. 2 is a sectional view taken along line X—X in FIG. 1;

FIG. 3 is a fragmented exploded perspective view of a part of the reel braking mechanism;

FIG. 4 is a fragmented front elevational view of the retractor device, partially in section, showing the normal reel braking operation;

FIG. 4' is a fragmented side elevational view of the device in the state shown in FIG. 4;

FIG. 5 is a view similar to FIG. 4 but showing the pawl in outwardly repelled position;

FIG. 5' is a view similar to FIG. 4' but in the state shown in FIG. 5;

FIG. 6 is a fragmented front elevational view, partially in section, of another embodiment of the present invention;

FIG. 7 is a side elevational view thereof; and

FIG. 8 is a fragmented exploded perspective view of a part of the reel braking mechanism thereof.

DESCRIPTION OF THE PREFERRED EMBODIMENTS

Referring now to the drawings, particularly in FIGS. 1 to 5 thereof, which illustrate a preferred embodiment of the present invention, the reference letter A generally designates a U-shaped mounting bracket or frame which is mounted at a predetermined angle to the vehicle floor or to a side wall of the seat of the associated vehicle. A shaft B extends between and is journalled to the side walls of frame A and a retractor reel rewind or biassing spiral spring C is located on an outside face of one of the frame side walls and has ends anchored to shaft B and the frame side wall. A reel E is affixed to shaft B between the frame side walls and one end portion of the safety belt D is connected to an wound in reel E.

The reel locking mechanism comprises a ratchet wheel 1 and a ratchet wheel 2 secured to the opposite end portions of the reel E inside both side walls of the frame A and affixed to the shaft B together with the reel E. The ratchet wheel 2 has a same shape and number of teeth as the ratchet wheel 1 but is so angularly related or phase relative to ratchet wheel 1 that each tooth of ratchet wheel 1 is angularly or peripherally displaced from each corresponding tooth of the wheel 1 by a half of the pitch or width of the ratchet wheel tooth. A pair of laterally spaced vertical walls 3 and 4 are mounted to the bottom web of frame A inside the frame sidewalls by bolts or like means or formed by cutting and shaping the bottom web of the frame and four segment-shaped openings 5, 5', 6 and 6' are formed in both side walls of the frame A as well as in both vertical walls 3 and 4 in lateral alignment with each other. Pawls 7 and 8 are separately rockably supported respectively by two pairs of the openings 5 and 6 and 5' and 6', each pawl being capable of swinging into and out of engagement with a respective ratchet wheel 1 and 2 independently of the other pawl. Shaft-connecting sections 7' and 8' consisting of shoulders, holes, grooves or locking sections are disposed on the inside of both pawls 7 and 8 and being formed by bending one end each of the pawls 7 and 8 or by suitable members provided integrally therewith. A thin shaft 9 consisting of a round rod of flat plate having its ends coupled to the pawls 7 and 8 and extending laterally between the vertical walls 3 and 4, and engaging the shaft-connecting sections 7',8' with the right and left ends thereof being capable of sliding properly along the internal faces of the vertical walls 3 and 4. The pawls 7 and 8 may be connected outside of the vertical walls 3 and 4 by the thin shaft 9 being inserted into apertures which are formed in both vertical walls 3 and 4, or alternatively a concave or convex section may be provided at the intermediate portion of the thin shaft 9 as a support point, or the thin shaft 9 may be provided with stops at both ends to prevent the movement of the shaft to the right or left. Transmission member 10 which moves vertically as soon as an acceleration sensing mechanism, hereinafter described, senses an acceleration or a deceleration speed, has a suitable shape such as a cylinder in accordance with the structure of the sensing mechanism and normally retains the thin shaft 9 in an equilibrium or balanced state.

Finally, the acceleration/deceleration speed sensing mechanism comprises a sensing socket or mount 12 supported at the bottom of the frame A and having a central cylindrical vertical bore vertically slideably engaging transmission member 10 which is movable in a vertical direction at a predetermined support point of the thin shaft 9. A displacement member or acceleration sensing member 13 such as a pendulum, a steel ball rollable on a pan or a downwardly directed conical weight which, upon sensing any acceleration or deceleration or inclination of the car, is universally swingable or movable in all directions along the entire periphery thereof and, by means of its movement, causes a part thereof such as the cammed apex to displace in a vertical direction the transmission member 10.

Referring now to FIGS. 6 to 8 which illustrate another embodiment of the present invention in which similar references designate similar parts, the retractor mechanism as well as the acceleration/deceleration speed sensing mechanism in this embodiment are substantially the same as those in the first described embodiment. However, the positioning of the ratchet wheel 2 and the sensing mount 12 are varied in this second embodiment.

Specifically, two ratchet wheels 1' and 2' affixed to the shaft B have different numbers of teeth from each other. The ratchet wheels 1' and 2' are secured to the shaft B and relatively angularly related in such manner that the tooth bottoms of the wheels are angularly offset and never mutually aligned, and at least one tooth of one of the ratchet wheels is placed so as to be peripherally interposed between the spacing defined by a pair of teeth of the other wheel corresponding to said at least one tooth.

As shown in FIG. 7, the two ratchet wheels 1' and 2' may be of different diameters from each other. Likewise pawls 14 and 15, in order to engage with the wheels 1' and 2' may be at different distances from support point and weight, and they are swingably mounted to the side walls of the frame A or to the vertical walls 3 and 4 respectively in the like manner as in the first described embodiment. At a proper position in the proximity of the end portion of each pawl 14 and 15, as shown in FIG. 8, for example, both of the pawls 14 and 15 are coupled by a thin shaft 9' in nearly a transverse straight line position with each other by way of eccentric shaft coupling sections 14' and 15' on pawls 14 and 15. The thin shaft 9' is coupled with the sections 14' and 15' by engaging long or triangular holes therein and has a support point which is laterally offset, that is, is differently spaced from the right and left ends or sides. The thin shaft 9' is mounted or disposed on a sensor transmission member 10' which is vertically slideable in sleeve section 11' of sensing mount 12', which is supported on the inside face of one of the side walls of the frame A. The lengths from the support point as well as the weight of the pawls 14 and 15 are selected properly so that the thin shaft 9' is suspended in an equilibrium state under normal conditions.

Considering the operation of the first embodiment, when positive or negative acceleration, that is acceleration or deceleration, exceeds a predetermined level, such as is imparted to the present apparatus due to a collision of the car or the like, one part of the sensing or displacement member 13 such as a flat apex at the top of the pendulum is upwardly displaced whereby the transmission member 10 is raised to slide upwardly.

Simultaneously, the thin shaft 9 which has been normally kept in an equilibrium state is also elevated generally with its equilibrium state kept as shown in FIG. 4. In consequence, the tooth tops of both pawls 7 and 8 are also pushed upwardly on an average towards the tooth bottoms of the ratchet wheels 1 and 2, respectively. Since the teeth of the pawls 7 or 8 are differently phasally or peripherally related or deviated from the teeth of respective ratchet wheels 1 and 2 by a half of a pitch as shown clearly in FIG. 4, the top of one of the pawls 7 or 8 engages earlier a respective ratchet wheel 1 or 2, e.g. the ratchet wheel 2 shown in FIG. 4' as the seat belt D is extracted. Accordingly, the extraction of the seat belt D is inhibited together with the extraction rotation of reel E.

Under altered conditions, the acceleration or deceleration speed is similarly applied and the thin shaft 9 is generally elevated and the tooth top of either of the pawls strongly strikes the tooth top of a corresponding ratchet wheel, the tooth top of the respective pawl is repelled and pushed outwardly. FIG. 5 illustrates the state where the pawl 8 is outwardly repelled. In this instance, the transmission member 10 is retained at the elevated position while the pawl 8 is positioned outwardly (at a downward position in FIG. 5) so that the thin shaft 9 supported by transmission member 10 pushes the pawl 7 upwardly to the engaging position.

As a result, the pawl 7 instantaneously and stably engages with the tooth bottom of the ratchet wheel 1 which is positioned within the range of a half of pitch from the repelled tooth of the ratchet wheel 2; thereby such an engagement prevents the seat belt D from being further extracted.

Considering now the operation of the second described embodiment, illustrated in FIG. 6, the thin shaft 9' on the transmission member 10' is longer on the right side than on the left side. In conjunction with the distances of the support point of both pawls as well as the weight thereof, this arrangement allows the pawl 15 on the longer side of the thin shaft 9' to elevate more slowly in normal operation in the case of emergency and on the contrary, allows the pawl 14 to reach and engage with the ratchet wheel 1' more quickly (in such a short period of time as 8 milli-sec., for example) than the elevation speed of the transmission member 10'.

In other words, the pawl 14 principally engages with the ratchet wheel 1' to prevent the extraction of the seat belt D in the case of emergency.

The shorter portion of the thin shaft 9' is pushed upwardly with a stronger force than when the support point thereof is positioned at the center. Likewise, the amplitude of up and down rocking is smaller than when the support point is at the center. For these reasons, such an amplitude of displacement caused resiliently is reduced as the tooth top of the pawl 14 is outwardly repelled.

If the pawl 14 is pushed out accidentally the repelling force in this embodiment is stronger than that of the first embodiment so that the pawl 15 immediately engages with the teeth of the ratchet wheel 2'. In this instance, since the tooth bottom of the ratchet wheel 2' is positioned within a gap of one tooth of the ratchet wheel 1', it engages with the ratchet wheel 2' stably within the range of one tooth or within such a short period of time as 3 milli-sec., for example, immediately after the pawl 14 is outwardly repulsively repelled. In consequence, the seat belt D is prevented from being further extracted.

Finally, the apparatus of the present invention supplies the following technical advantages, namely, the present apparatus even having such a simple construction eliminates chances of mis-locking of the conventional acceleration-responsive retractor in which the pawl is often times outwardly repelled from engagement with the ratchet wheel, and therefore it enhances the safety of the vehicle passengers with enhanced reliability.

While there have been described and illustrated preferred embodiments of the present invention, it is apparent that numerous alterations, omissions and additions may be made without departing from the spirit thereof.

I claim:

1. A vehicle acceleration responsive safety belt retractor comprising:
   a U-shaped frame (A) including side walls;
   a reel (E) mounted between said side walls and having a belt (D) coupled thereto and being rotatable in opposite belt extraction and retraction directions;
   means spring biasing said reel in a belt retraction direction;
   a pair of ratchet wheels (1,2) located on opposite sides of said reel and rotatable and coaxial therewith, the teeth of one of said reels being peripherally offset relative to the teeth of the other reel by one-half the pitch of said teeth;
   a pair of independently operable pawls (7,8) rockable into and out of engagement with respective ratchet wheels (1,2) to respectively lock and release said reel in the belt extraction direction;
   a cross piece (9) having its opposite end portions engaging substantially transversely aligned eccentric points on said pawls;
   a condition sensing member (13) responsive to a predetermined value of the acceleration of said vehicle; and an actuating member (10) movable in response to said sensing member, said cross piece being movable by said actuating member to advance said pawls toward ratchet wheel engage positions and being so disposed that the intermediate portion of said cross piece assumes a rest state proximate said actuating member under normal conditions.

2. In a vehicle acceleration responsive safety belt retractor wherein a belt (D) is resiliently, retractably and extractably wound onto a shaft (B) which is mounted to a U-shaped frame (A) and retractably biased by means of a return spring (C) and a reel (E) the improvement to said apparatus comprising: a pair of ratchet wheels (1', 2') affixed to said shaft (B) proximate the side walls of said frame (A) said ratchet wheel 1' having a different number of teeth than said ratchet wheel 2'; pawls (14,15) each being disposed to engage with a respective ratchet wheel (1',2') to lock said reel in a belt extraction direction and being mutually independently advanceable and having respective connecting sections (14', 15'); a movable transmission member (10'); and a thin shaft (9') connecting said pawls (14,15) whereby said connecting sections (14' and 15') thereof are substantially transversely aligned and whereby said thin shaft (9') is retained in a retracted state at the upper end section of said transmission member under normal conditions as determined at least in part by the support distances and weights of both of said pawls (14, 15) and the distances from the support point of said thin shaft (9').

3. An automatic locking vehicle safety belt retractor device comprising a reel rotatable in opposite belt extraction and belt retraction directions and spring biased in a belt retraction direction, a pair of first and second ratchet wheels rotatable with said reel, a pair of independently movably mounted first and second pawls transferrable between advance positions respectively engaging said first and second ratchet wheels to lock said reel in a belt extraction direction and retracted positions disengaging said ratchet wheels, each of said pawls including an eccentric section, a transverse cross piece having its ends engaging respective eccentric sections, actuating means for advancing said pawls, the peripheral phase relationship between the advanced first pawl and the teeth of said first ratchet wheel and between the advanced second pawl and the teeth of said ratchet wheel being different, said actuating means including a sensing member responsive to a predetermined value of the acceleration of the vehicle and an actuating member movable between retracted and advanced positions in response to said sensing member responding to said pedetermined value and engaging said cross piece between the ends thereof at least when said actuating member is advanced.

4. The retractor device of claim 3 wherein said sensing member comprises a pendulum.

5. The retractor device of claim 3 wherein said cross piece comprises a thin shaft.

6. The retractor device of claim 3 wherein said ratchet wheels have the same numbers of teeth and said first ratchet wheel is angularly displaced relative to said second ratchet wheel a fraction of the pitch of one of said ratchet wheel teeth.

7. The retractor device of claim 6 wherein said fraction is one-half.

8. The retractor device of claim 3 wherein said ratchet wheels have different numbers of teeth.

9. The retractor device of claim 3 including means for supporting said pawls for rocking about axes which are approximately transversely aligned.

10. The retractor device of claim 3 wherein said actuating member engages said cross piece at a point laterally offset from the center thereof.

* * * * *